United States Patent
Inami

(10) Patent No.: US 11,736,642 B2
(45) Date of Patent: Aug. 22, 2023

(54) IMAGE FORMING APPARATUS

(71) Applicant: KYOCERA Document Solutions Inc., Osaka (JP)

(72) Inventor: Nozomu Inami, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 17/972,431

(22) Filed: Oct. 24, 2022

(65) Prior Publication Data
US 2023/0140588 A1    May 4, 2023

(30) Foreign Application Priority Data

Oct. 28, 2021   (JP) .................... 2021-176541

(51) Int. Cl.
*H04N 1/00* (2006.01)
*H04N 1/393* (2006.01)

(52) U.S. Cl.
CPC ......... *H04N 1/00816* (2013.01); *H04N 1/393* (2013.01)

(58) Field of Classification Search
CPC .............. H04N 1/00816; H04N 1/393; H04N 1/00681; H04N 1/00708; H04N 1/00726; H04N 1/00748; H04N 1/3873
See application file for complete search history.

(56) References Cited

U.S. PATENT DOCUMENTS

| | | | | |
|---|---|---|---|---|
| 2003/0099378 | A1* | 5/2003 | Ide | G06V 10/10 382/199 |
| 2011/0002015 | A1* | 1/2011 | Hayakawa | H04N 1/38 358/448 |
| 2011/0176186 | A1* | 7/2011 | Kanaya | H04N 1/3878 358/474 |
| 2017/0126915 | A1* | 5/2017 | Ishido | H04N 1/0057 |
| 2018/0213101 | A1 | 7/2018 | Sato et al. | |
| 2018/0332183 | A1* | 11/2018 | Seki | H04N 1/00814 |
| 2021/0087007 | A1* | 3/2021 | Morisaki | B65H 9/006 |

FOREIGN PATENT DOCUMENTS

JP    2018121146 A    8/2018

* cited by examiner

*Primary Examiner* — King Y Poon
*Assistant Examiner* — Michael L Burleson
(74) *Attorney, Agent, or Firm* — Alleman Hall Creasman & Tuttle LLP

(57) ABSTRACT

A reading portion generates an original image including an image of a document sheet. A first document sheet end detection portion, in a case where the thickness of the document sheet is equal to or greater than a threshold value, identifies a peripheral edge shape of the document sheet by detecting a shadow portion that occurs at a peripheral edge portion of the document sheet in the original image. A second document end detection portion, in a case where the thickness of the document sheet is less than a threshold value, identifies the peripheral edge shape based on a specification by the user. A document sheet size determination portion determines a size of the document sheet according to a result of shape identification by the first document sheet end detection portion or a result of shape identification by the second document sheet end detection portion.

4 Claims, 6 Drawing Sheets

IMAGE FORMING APPARATUS

INCORPORATION BY REFERENCE

This application is based upon and claims the benefit of priority from the corresponding Japanese Patent Application No. 2021-176541 filed on Oct. 28, 2021, the entire contents of which are incorporated herein by reference.

BACKGROUND

The present disclosure relates to an image forming apparatus.

For example, a conventional image reading apparatus determines whether a type of a document sheet is a thick sheet or a thin sheet based on image data of the read document sheet. A state of a shadow that occurs on an edge portion of the document sheet differs depending on a thickness of the document sheet. Therefore, in the image data, a deviation of a gradation value corresponding to the edge portion of the document sheet differs depending on the thickness of the document sheet. In a conventional image reading apparatus, a central processing unit (CPU) determines the thickness of a document sheet according to deviation of gradation values in image data. Such a CPU is an example of a document sheet thickness detection portion.
[0004]
On the other hand, in a conventional image reading apparatus it is not possible, based on image data, to determine a size of a document sheet with good accuracy.

SUMMARY

A first image forming apparatus according to the present disclosure includes a reading portion, a document sheet thickness detection portion, a first document sheet end detection portion, a second document sheet end detection portion, and a document sheet size determination portion. The reading portion generates an original image including an image of a document sheet. The document sheet thickness detection portion detects a thickness of the document sheet. The first document sheet end detection portion, in a case where the thickness detected by the document sheet thickness detection portion is equal to or greater than a threshold value, identifies a peripheral edge shape of the document sheet by detecting a shadow portion that occurs at a peripheral edge portion of the document sheet in the original image. The second document end detection portion, in a case where the thickness detected by the document sheet thickness detection portion is less than the threshold value, presents the original image to a user and identifies the peripheral edge shape of the document sheet based on a specification by the user. The document sheet size determination portion determines a size of the document sheet according to a result of shape identification by the first document sheet end detection portion or a result of shape identification by the second document sheet end detection portion.

A second image forming apparatus according to the present disclosure includes a reading portion, a document sheet thickness detection portion, a first document sheet end detection portion, a third document sheet end detection portion, and a document sheet size determination portion. The reading portion generates an original image including an image of a document sheet. The document sheet thickness detection portion detects a thickness of the document sheet. The first document sheet end detection portion, in a case where the thickness detected by the document sheet thickness detection portion is equal to or greater than a threshold value, identifies a peripheral edge shape of the document sheet by detecting a shadow portion that occurs at a peripheral edge portion of the document sheet in the original image. The third document sheet end detection portion, in a case where the thickness detected by the document sheet thickness detection portion is less than the threshold value, identifies a peripheral edge shape of the document sheet by detecting a partial image included in the document sheet in the original image. A document sheet size determination portion determines a size of the document sheet in accordance with a result of the shape identification by the first document sheet end detection portion or a result of the shape identification by the third document sheet end detection portion.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
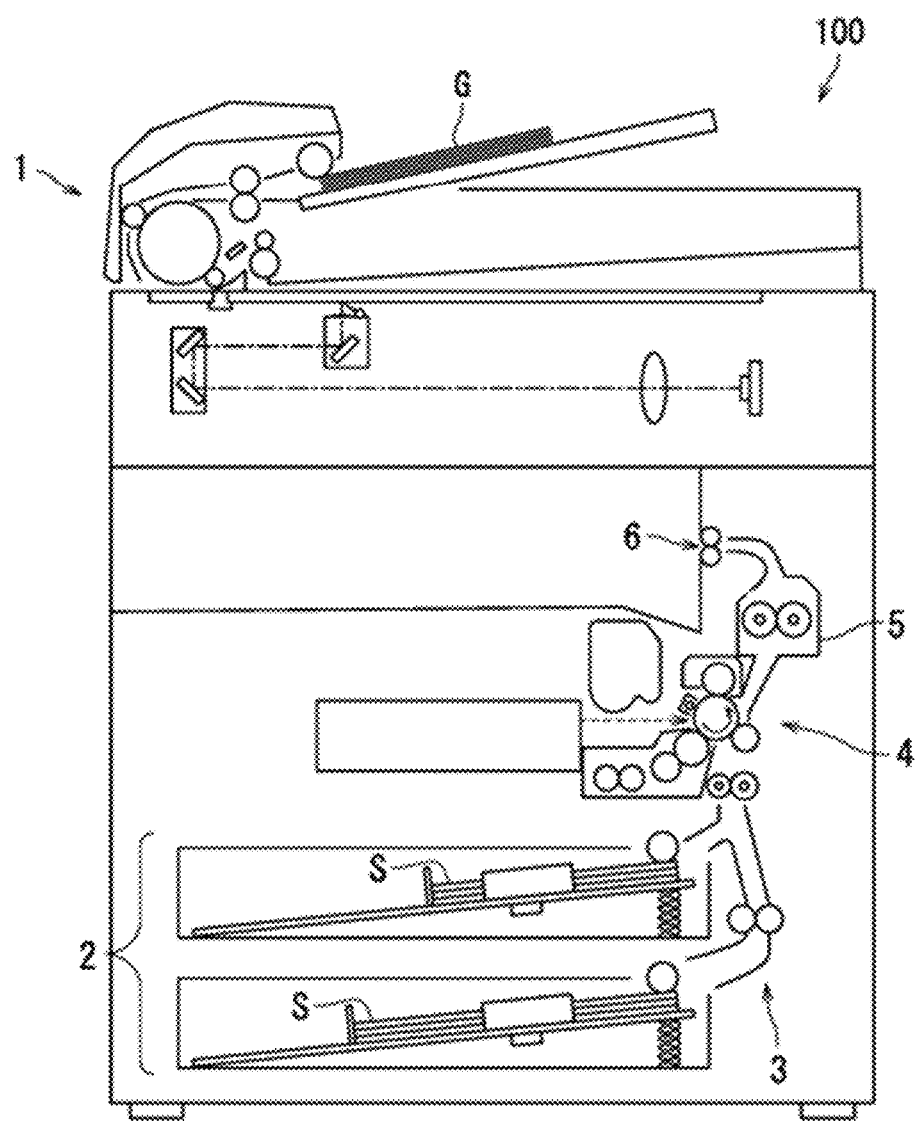
FIG. 1 is a schematic diagram showing an example of a configuration of an image forming apparatus according to an embodiment.

Embodiments according to the present disclosure will be described with reference to the drawings. Note that in the drawings, the same or corresponding parts are denoted by the same reference numerals, and descriptions thereof will not be repeated.

An image forming apparatus 100 according to an embodiment will be described with reference to FIG. 1. FIG. 1 is a schematic diagram showing an example of a configuration of an image forming apparatus 100. The image forming apparatus 100 is, for example, a copier, a printer, a facsimile machine, or a multifunction peripheral having these functions.

As shown in FIG. 1, image forming apparatus 100 includes a reading portion 1, a feeding portion 2, a conveying portion 3, an image forming portion 4, a fixing portion 5, and a discharging portion 6.

The reading portion 1 reads an image of a document sheet G. The reading portion 1 generates image data from the read image. For example, the reading portion 1 has an auto document feeder (ADF), a platen cover, a contact glass, and an optical reading mechanism. The document sheet G set in the ADF with the platen cover closed is automatically conveyed, and an image of the document sheet G is read. The user may also open the platen cover, place a document sheet G such as an ID card on the contact glass, and have the image of the document sheet G read.

The feeding portion 2 accommodates a plurality of sheets S and feeds the sheets S to the conveying portion 3. The sheet S is made of paper or synthetic resin, for example. The conveying portion 3 includes a plurality of conveying roller pairs and conveys the sheet S to the image forming portion 4.

The image forming portion 4 forms a toner image on the sheet S by an electrophotographic method. The image forming portion 4 includes a photoconductor drum, a charging device, an exposure device, a developing device, a supply device, a transfer device, a cleaning device, and an electrostatic neutralizing device. The fixing portion 5 heats and presses the toner image to fix the toner image onto the sheet S. The conveying portion 3 conveys the sheet S on which the toner image is fixed to the discharging portion 6. The discharging portion 6 discharges the sheet S to the outside of the image forming apparatus 100.

Figure 2:
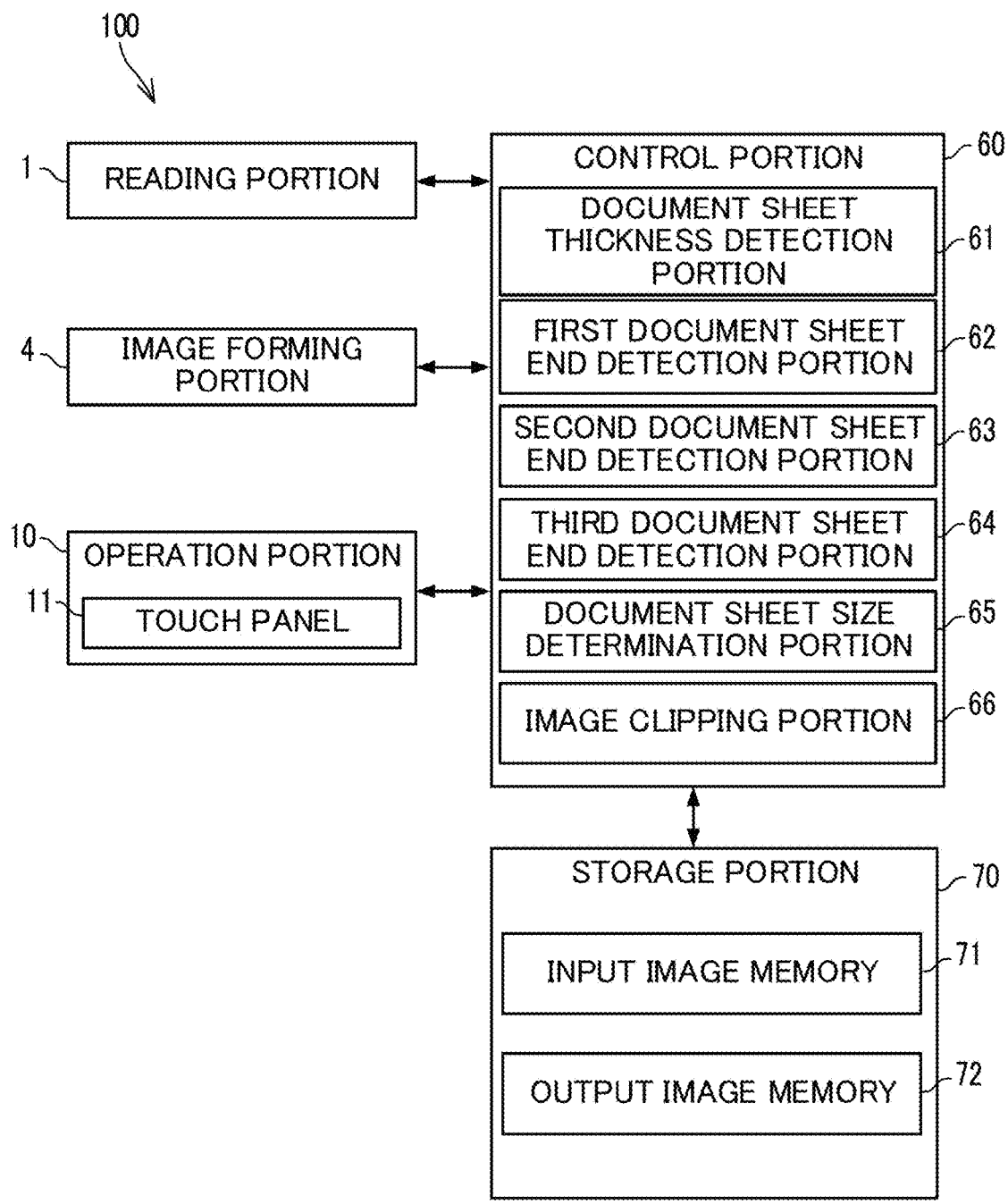
FIG. 2 is a block diagram showing an example of circuit configuration of an image forming apparatus.

Next, the circuit configuration of the image forming apparatus 100 will be described with reference to FIGS. 1 and 2. FIG. 2 is a block diagram showing an example of the circuit configuration of the image forming apparatus 100.

As shown in FIG. 2, the image forming apparatus 100 further includes an operation portion 10, a control portion 60 and a storage portion 70.

The operation portion 10 serves both as an input device for various user operations and as a display device for displaying messages to a user. The operation portion 10 includes, for example, a touch panel 11 and a plurality of push buttons.

The storage portion 70 includes a storage device and stores data and computer programs. The storage portion 70 includes a main storage device such as a semiconductor memory and an auxiliary storage device such as a hard disk drive (HDD).

The storage portion 70 has, for example, an input image memory 71 and an output image memory 72. The reading portion 1 generates an original image including the image of the document sheet G. The input image memory 71 stores data of the original image memory. The output image memory 72 stores data representing the image of the document sheet G clipped from the original image.

The control portion 60 includes a processor such as a CPU, and by executing computer programs stored in the storage portion 70, controls each component of the image forming apparatus 100. In addition, the control portion 60, by executing computer programs stored in the storage portion 70, functions as a document sheet thickness detection portion 61, a first document sheet end detection portion 62, a second document sheet end detection portion 63, and a third document sheet end detection portion 64, a document sheet size determination portion 65, and an image clipping portion 66. The user, via the operation portion 10, can give the image forming apparatus 100 a selection related to whether or not it is desired to automatically detect a peripheral edge shape of the document sheet G. Hereinafter, a selection for which automatic detection is not desired is referred to as a first selection, and a selection for which automatic detection is desired is referred to as a second selection. The first selection means that automatic detection of the peripheral edge shape of the document sheet G is not effective, and the second selection means that automatic detection of the peripheral edge shape of the document G is effective.

The document sheet thickness detection portion 61 detects the thickness of the document sheet G. In the original image, a deviation of a gradation value corresponding to a shadow portion occurring at an edge portion of the document sheet G differs depending on the thickness of the document sheet G. For example, the document sheet thickness detection portion 61 determines the thickness of the document sheet G according to the deviation of the gradation value corresponding to the shadow portion in the original image.

In a case where the detected thickness of the document sheet G is equal to or greater than a threshold value, the first document sheet end detection portion 62 detects a portion corresponding to a shadow occurring at the peripheral edge portion of the document sheet G in the original image. Further, the first document sheet end detection portion 62 identifies the peripheral edge shape of the document sheet G according to a detected position of the shadow portion. The first document sheet end detection portion 62, in a case where the thickness of the document sheet G is equal to or greater than the threshold value, automatically identifies the peripheral edge shape of the document sheet G in both the first selection and the second selection.

The second document sheet end detection portion 63 executes the following process in a case where the selection by the user is the first selection. That is, in a case where the detected thickness of the document sheet G is less than the threshold value, the second document sheet end detection portion 63 presents the original image including the image of the document sheet G to the user, and identifies the peripheral edge shape of the document sheet G based on a specification by the user. The second document sheet end detection portion 63 presents the original image to the user via a display device of the operation portion 10.

On the other hand, the third document sheet end detection portion 64 automatically executes the following process in a case where the user selects the second selection. That is, in a case where the detected thickness of the document sheet G is less than the threshold value, the third document sheet end detection portion 64 detects a partial image included in the document sheet G from the original image. Further, the third document sheet end detection portion 64 identifies the peripheral edge shape of the document sheet G based on the shape of the detected partial image.

The document size determination portion 65 determines the size of the document sheet G according to the result of shape identification by the first document sheet end detection portion 62, the result of shape identification by the second document sheet end detection portion 63, or the result of shape identification by the third document sheet end detection portion 64.

The image clipping portion 66, according to the size of the document sheet G determined by the document size determination portion 65, clips the image of the document sheet G from the original image including the image of the document sheet G.

Figure 3:
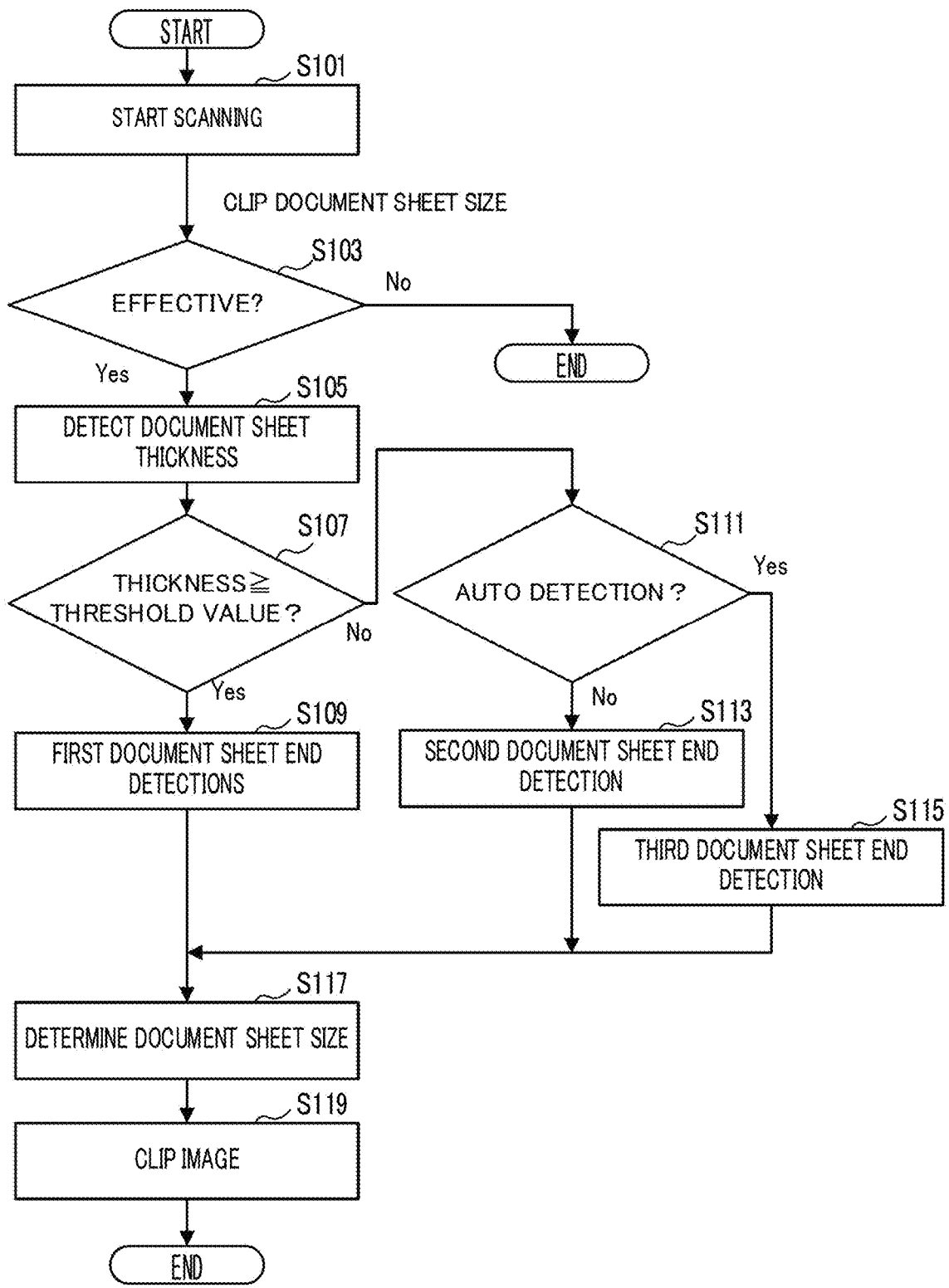
FIG. 3 is a flowchart showing an example of an operation of a control portion.

Next, the operation of the control portion 60 will be described with reference to FIG. 1 to FIG. 3. FIG. 3 is a flowchart showing an example of operation of the control portion 60. The user, via the operation portion 10, can request the image forming apparatus 100 to execute cropping of the document sheet size.

Step S101

As shown in FIG. 3, the control portion 60 causes the reading portion 1 to start scanning the document sheet G. When the processing of step S101 is completed, the processing by the control portion 60 proceeds to step S103.

Step S103

The control portion 60 determines whether or not cropping of the document sheet size is effective. In a case where the control portion 60 determines that cropping of the document sheet size is effective (YES in step S103), processing by the control portion 60 proceeds to step S105. In a case where the control portion 60 determines that cropping of the document sheet size is not effective (NO in step S103), the processing by the control portion 60 ends.

Step S105

The control portion 60 derives the deviation of the gradation value of the portion corresponding to the shadow occurring at the peripheral edge portion of the document sheet G in the original image. Further, the control portion 60 determines the thickness of the document sheet G according to the derivation result of the deviation of the gradation value. The process of step S105 is executed by the document sheet thickness detection portion 61.

Step S107

The control portion 60 determines whether or not the thickness of the document sheet G is equal to or greater than the threshold value. In a case where the control portion 60 determines that the thickness of the document sheet G is equal to or greater than the threshold value (YES in step S107), the processing by the control portion 60 proceeds to step S109. In case where the control portion 60 determines that the thickness of the document sheet G is less than the threshold value (NO in step S107), the processing by the control portion 60 proceeds to step S111.

Step S109

The control portion 60 executes a procedure for detecting a first document sheet end, which will be described later (see FIG. 4). When the processing of step S109 is completed, the processing by the control portion 60 proceeds to step S117.

Step S111

The control portion 60 determines whether or not automatic detection of the peripheral edge shape of the document sheet G is effective. In a case where the control portion 60 determines that the automatic detection of the peripheral edge shape is effective (YES in step S111), the processing by the control portion 60 proceeds to step S115. In a case where the control portion 60 determines that the automatic detection of the peripheral edge shape is not effective (NO in step S111), the processing by the control portion 60 proceeds to step S113.

Step S113

The control portion 60 executes a procedure for detecting a second document sheet end, which will be described later (see FIG. 5). When the processing of step S113 is completed, the processing by the control portion 60 proceeds to step S117.

Step S115

The control portion 60 executes a procedure for detecting a third document sheet end, which will be described later (see FIG. 6). When the processing of step S115 is completed, the processing by the control portion 60 proceeds to step S117.

Step S117

The control portion 60 determines the size of the document sheet G according to the result of the first document sheet end detection, the second document sheet end detection, or the third document sheet end detection.

Step S119

The control portion 60, according to the size of the document G determined in step S117, clips the image of the document sheet G from the original image including the image of the document sheet G. When the processing of step S119 is completed, the processing by the control portion 60 ends.

Next, referring to FIG. 4, the operation procedure of the first document sheet end detection portion 62 will be described. FIG. 4 is a diagram showing an example of the operation procedure by the first document sheet end detection portion 62. The document sheet G is, for example, an ID card placed on the contact glass.

Step S201

Figure 4:
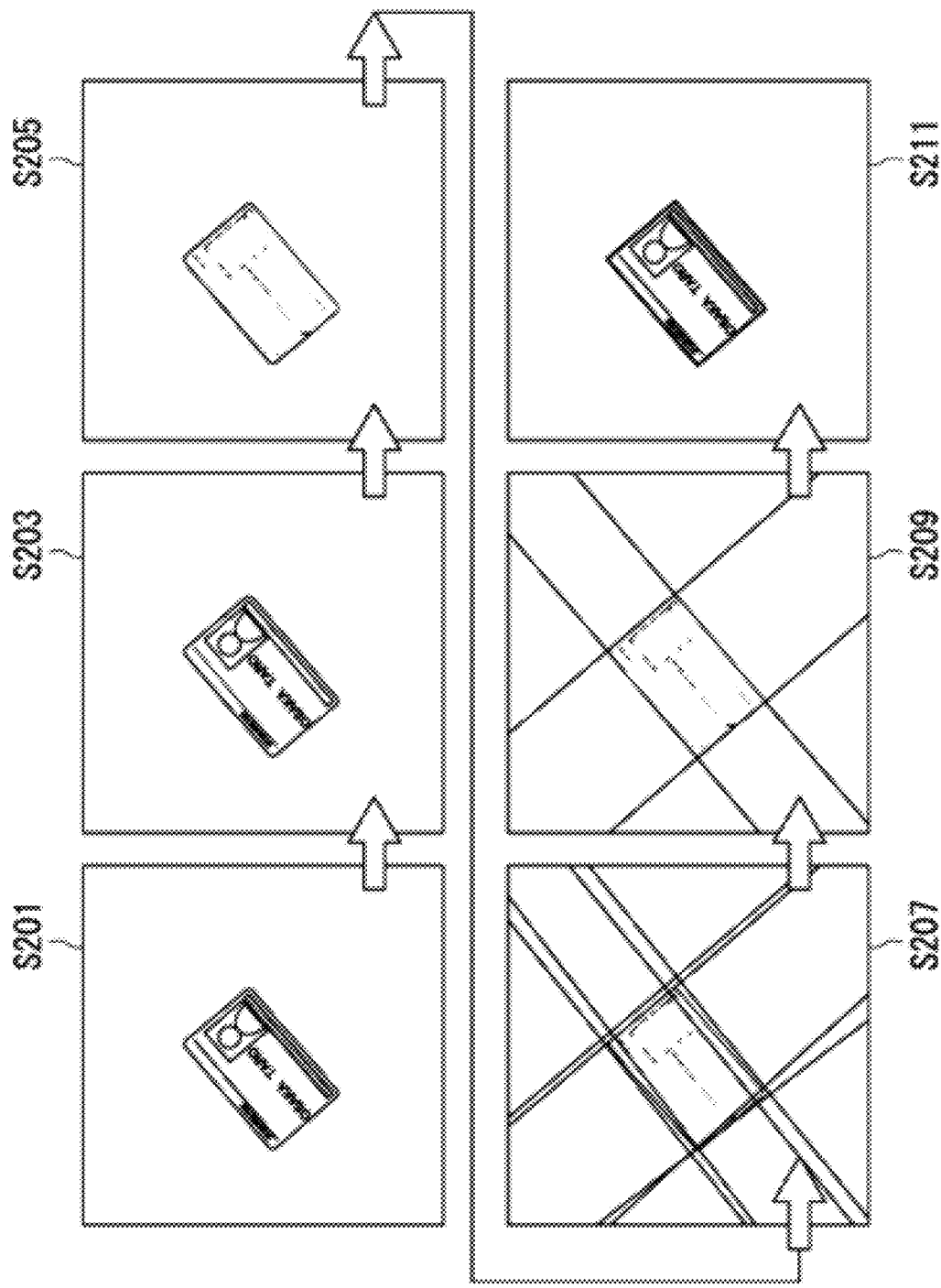
FIG. 4 is a diagram showing an example of an operation procedure of a first document sheet end detection portion.

As shown in FIG. 4, the first document sheet end detection portion 62 acquires the original image including the image of the document sheet G from the input image memory 71. The thickness of the document sheet G is equal to or greater than the threshold value, and thus a clear shadow occurs at the peripheral edge portion of the document sheet G in the original image. The processing by the control portion 60 proceeds from step S201 to step S203.

Step S203

Subsequently, the first document sheet end detection portion 62 executes an edge extraction process on the original image. The processing by the control portion 60 proceeds from step S203 to step S205.

Step S205

Next, the first document sheet end detection portion 62 deletes unnecessary data that does not contribute to the peripheral edge shape of the document sheet G from among the extracted edges. The processing by the control portion 60 proceeds from step S205 to step S207.

Step S207

Subsequently, the first document sheet end detection portion 62 executes a straight line extraction process on the original image from which unnecessary data has been deleted. As a result, a plurality of straight line images are extracted. The processing by the control portion 60 proceeds from step S207 to step S209.

Step S209

Continuing, the first document sheet end detection portion 62 executes a process that extracts four contour line images from among the plurality of extracted straight line images The processing by the control portion 60 proceeds from step S209 to step S211.

Step S211

Finally, the first document sheet end detection portion 62, based on the positions of the four extracted contour line images, identifies a rectangle representing the peripheral edge shape of the document sheet G. This completes the procedure for detecting the first document sheet end.

The thickness of the document sheet G is less than the threshold value, and thus the image of the shadow at the peripheral edge portion of the document sheet G is less likely to appear in the original image. Therefore, there is a possibility that the peripheral edge shape of the document sheet G may be erroneously identified in the processing by the first document sheet end detection portion 62. Therefore, the processing by the second document sheet end detection portion 63 or the third document sheet end detection portion 64 is executed.

Next, referring to FIG. 5, the operation procedure of the second document sheet end detection portion 63 will be described. FIG. 5 is a diagram showing an example of the operation procedure by the second document sheet end detection portion 63.

Step S301

Figure 5:
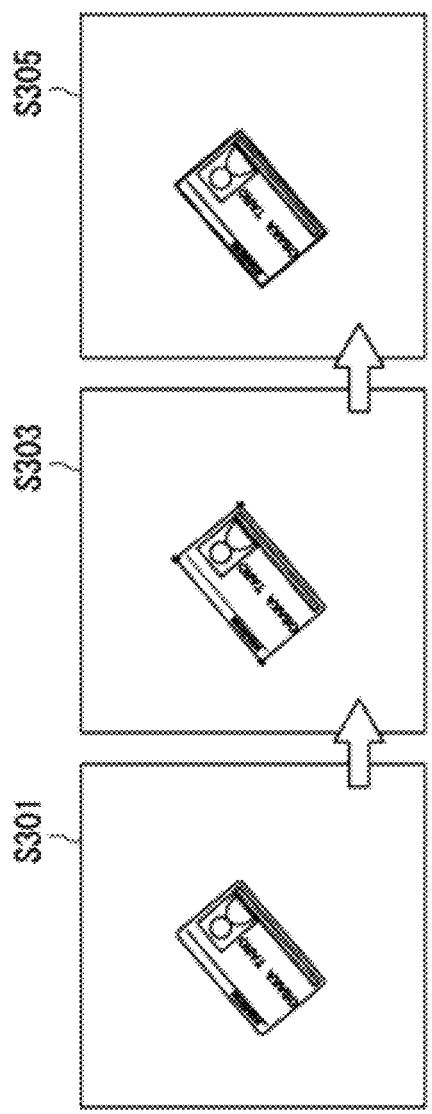
FIG. 5 is a diagram showing an example of an operation procedure of a second document sheet end detection portion.

As shown in FIG. 5, the second document sheet end detection portion 63 presents the original image including the image of the document sheet G to the user via the display device of the operation portion 10. Further, the second document sheet end detection portion 63 prompts the user to use the touch panel 11 to designate three points on the original image corresponding to three corners of the document sheet.

Step S303

When the user designates three points corresponding to the three corners on a screen, the second document sheet end detection portion 63 acquires position information of the designated three points.

Step S305

Finally, the second document sheet end detection portion 63, based on the acquired position information of the three points, identifies a rectangle representing the peripheral edge shape of the document sheet G Next, referring to FIG. 6, the operation procedure by the third document sheet end detection portion 64 will be described. FIG. 6 is a diagram showing an example of the operation procedure by the third document sheet end detection portion 64.

Step S401

Figure 6:
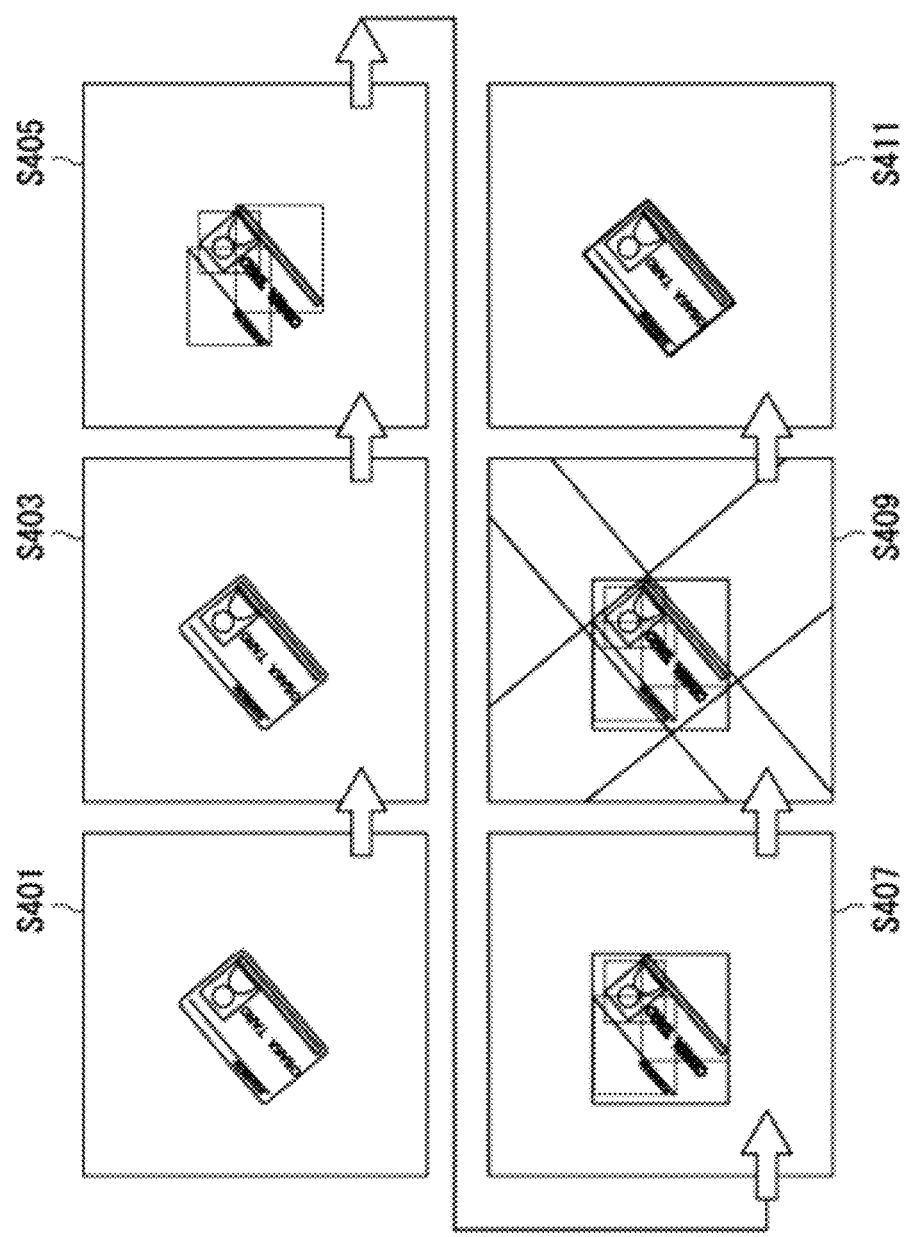
FIG. 6 is a diagram showing an example of an operation procedure of a third document sheet end detection portion.

As shown in FIG. 6, the third document sheet end detection portion 64 acquires the original image including the image of the document sheet G from the input image memory 71. The processing by the control portion 60 proceeds from step S401 to step S403.

Step S403

Subsequently, the third document sheet end detection portion 64 executes a process that binarizes the original image. The processing by the control portion 60 proceeds from step S403 to step S405.

Step S405

Next, the third document sheet end detection portion 64 detects one or more isolated areas from among the binarized original image. An isolated area represents an area in which black is connected to a white background, and includes partial images of objects such as characters and figures included in the document sheet G. Further, the third document sheet end detection portion 64 identifies one or more unit rectangles that are rectangles circumscribing each isolated area. The processing by the control portion 60 proceeds from step S405 to step S407.

Step S407

Continuing, the third document sheet end detection portion 64 then joins one or more unit rectangles. Further, the third document sheet end detection portion 64 identifies a combined rectangle, which is a rectangle circumscribing a shape formed by combining one or more unit rectangles. The combined rectangle encompasses all objects.

Step S409

Continuing, the third document sheet end detection portion 64, based on the image in the combined rectangle, detects an inclination of and positions of four edges of the document sheet G.

Step S411

Finally, the third document sheet end detection portion 64, based on the detected inclination of and the positions of the four edges of the document sheet G, identifies a rectangle representing the peripheral edge shape of the document sheet G.

According to the embodiment, an image forming apparatus 100 is provided that can determine with good precision the size of a document sheet G regardless of the thickness of the document sheet G.

An embodiment of the technique according to the present disclosure has been described above with reference to the drawings. However, the technique according to the present disclosure is not limited to the embodiments described above, and can be embodied in various aspects without departing from the scope of the present disclosure.

In addition, various forms of the technique according to the disclosure are possible by appropriately combining a plurality of component disclosed in the above embodiment. For example, some components may be omitted from the components in the embodiment described above. In order to make the drawings easier to understand, the drawings mainly show each component schematically, and the numbers and the like of each component shown in the figures may differ from the actual ones for the convenience of making the drawings. In addition, each component shown in the above-described embodiment is an example and is not particularly limited, and various modifications are possible within a range that does not substantially deviate from the effects of the present disclosure.

In the embodiment, the image forming apparatus 100 is an electrophotographic type. However, the present invention is not limited to such. For example, the image forming apparatus 100 may be an inkjet type.

In addition, in the embodiment, the thickness of the document sheet G is detected according to the magnitude of the gradation deviation of the shadow occurring at the peripheral edge portion of the document sheet G. However, the embodiment is not limited to this. The ADF may include a multi-feed detection sensor that detects multi-feeding of document sheets G by detecting a degree of attenuation when ultrasonic waves pass through the document sheets G. In this case, a multi-feed detection sensor may be used to detect the thickness of the document sheet G The technique according to the present disclosure may be used in the field of image forming apparatuses.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus, comprising:
    a reading portion configured to generate an original image including an image of a document sheet;
    a document sheet thickness detection portion configured to detect thickness of the document sheet;
    a first document sheet end detection portion configured to identify a peripheral edge shape of the document sheet by detecting a shadow portion occurring at a peripheral edge portion of the document sheet in the original image in a case where the thickness detected by the document sheet thickness detection portion is equal to or greater than a threshold value;
    a second document sheet end detection portion configured to present the original image to a user and identify the peripheral edge shape of the document sheet based on a specification by the user in a case where the thickness detected by the document sheet thickness detection portion is less than the threshold value; and
    a document sheet size determination portion configured to determine a size of the document sheet in accordance with a result of shape identification by the first document sheet end detection portion or a result of shape identification by the second document sheet end detection portion.

2. The image forming according to claim 1, further comprising an image clipping portion configured to clip an image of the document sheet from the original image according to the size of the document sheet determined by the document sheet size determination portion.

3. A image forming apparatus comprising:
a reading portion configured to generate an original image including an image of a document sheet;
a document sheet thickness detection portion configured to detect thickness of the document sheet;
a first document sheet end detection portion configured to identify a peripheral edge shape of the document sheet by detecting a shadow portion occurring at a peripheral edge portion of the document sheet in the original image in a case where the thickness detected by the document sheet thickness detection portion is equal to or greater than a threshold value;
a third document sheet end detection portion configured to identify a peripheral edge shape of the document sheet by detecting a partial image included in the document sheet in the original image in a case where the thickness detected by the document sheet thickness detection portion is less than the threshold value; and
a document sheet size determination portion configured to determine a size of the document sheet in accordance with a result of shape identification by the first document sheet end detection portion or a result of shape identification by the third document sheet end detection portion.

4. The image forming apparatus according to claim 3, further comprising
an image clipping portion configured to clip an image of the document sheet from the original image according to the size of the document sheet determined by the document sheet size determination portion.

* * * * *